(12) United States Patent
Pun

(10) Patent No.: US 12,514,237 B2
(45) Date of Patent: Jan. 6, 2026

(54) AQUARIUM ORNAMENTAL MOTION SYSTEM

(71) Applicant: Chun Keung Pun, Hong Kong (CN)

(72) Inventor: Chun Keung Pun, Hong Kong (CN)

( * ) Notice: Subject to any disclaimer, the term of this patent is extended or adjusted under 35 U.S.C. 154(b) by 0 days.

(21) Appl. No.: 18/615,072

(22) Filed: Mar. 25, 2024

(65) Prior Publication Data

US 2024/0381854 A1 Nov. 21, 2024

Related U.S. Application Data

(60) Provisional application No. 63/466,813, filed on May 16, 2023.

(51) Int. Cl.
*A01K 63/00* (2017.01)

(52) U.S. Cl.
CPC .................................. *A01K 63/006* (2013.01)

(58) Field of Classification Search
CPC .... A01K 63/006; A01K 63/042; A01K 61/85; A01K 63/04; A01K 63/06; A63H 23/10; A63H 23/16; A63H 23/00
USPC ......................................................... 119/254
See application file for complete search history.

(56) References Cited

U.S. PATENT DOCUMENTS

| | | | | |
|---|---|---|---|---|
| 2,844,912 A * | 7/1958 | Sebesta | ................... | A63H 23/10 446/155 |
| 4,082,063 A * | 4/1978 | Strickland | ............... | A63H 23/10 446/155 |
| 4,534,914 A * | 8/1985 | Takahashi | ............. | B01F 33/403 239/533.13 |
| 5,947,784 A * | 9/1999 | Cullen | ................... | A63H 33/28 137/854 |
| 6,782,567 B1 * | 8/2004 | Austin | ................... | A63H 23/10 4/615 |
| 6,840,192 B1 * | 1/2005 | Pagano | ................ | A01K 63/042 285/133.11 |
| 9,629,344 B2 * | 4/2017 | Edwards | ................ | A01K 63/04 |
| 2017/0258056 A1* | 9/2017 | Brown | ................ | A01K 63/006 |
| 2020/0008403 A1* | 1/2020 | Lee | ........................ | A01K 61/85 |

* cited by examiner

*Primary Examiner* — Katelyn T Truong
(74) *Attorney, Agent, or Firm* — WPAT, PC

(57) ABSTRACT

The invention relates to an aquatic ornamental motion system for aquariums, comprising an air compressor and a multi-port valve located outside the aquarium, an inflatable body located inside the aquarium with an inlet connected to the multi-port valve, and connecting tubing. The system is configured to inflate and deflate the inflatable body connected to the multi-port valve by operating it, thereby causing the inflatable body to expand and contract, respectively, to simulate the motions of organisms in water. The invention also involves a method for creating dynamics that mimic aquatic organisms in an aquarium.

20 Claims, 10 Drawing Sheets

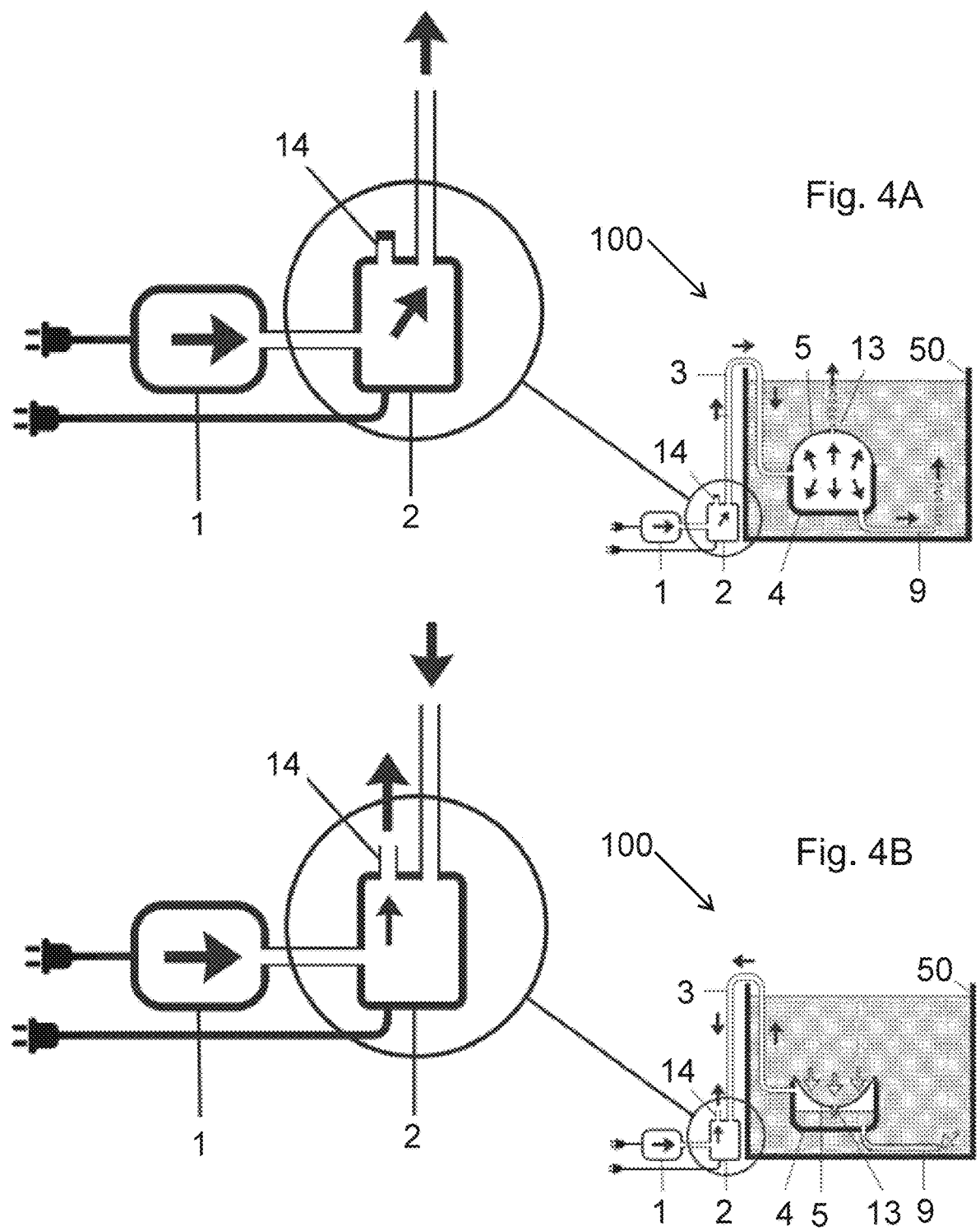

AQUARIUM ORNAMENTAL MOTION SYSTEM

FIELD OF THE INVENTION

The present invention relates to an aquarium ornamental motion system. In particular, the present invention provides movable ornamental objects that mimic aquatic creatures, which produce a dynamic ornamental effect in an aquarium.

BACKGROUND

Aquariums are containers commonly used by people for the observation and display of underwater life. To enhance the attractiveness and visual appeal of aquariums, designers have been dedicated to creating a system capable of simulating the movement of aquatic life. Existing aquarium observation systems typically rely on water flow, bubbles, or mechanical devices to create motion effects, but these methods have certain limitations and constraints. Traditional water flow devices often require the installation of complex pump systems and flow direction mechanisms, making them not only complicated in structure but also inflexible in use. Bubble devices, while capable of simulating the rising effect of bubbles, fail to provide a realistic and diverse simulation of aquatic life dynamics. Mechanical devices, on the other hand, often require extensive maintenance and adjustments, and are complex to operate.

SUMMARY OF THE INVENTION

The present invention provides a new type of aquarium decoration product that enables objects within an aquarium to move dynamically, such as the movements of anemones and cnidarians, to mimic real marine life. The aquarium decorations of this invention can be embedded in various sculptured decorations, which may have a natural appearance like wood or coral, or an artificial appearance like pottery or sculptures.

According to a first aspect of the invention, there is provided an aquarium ornamental motion system for aquariums, comprising an air compressor (i.e., air pump), a multi-port valve, tubing, a base member, and an expandable and contractible member. The base member is coupled with the expandable and contractible member to form an inflatable body. The tubing connects the components in a specific order, with the air compressor and multi-port valve located outside the aquarium, and the base member and expandable and contractible member placed inside the aquarium water. The aquarium ornamental motion system is configured to operate the multi-port valve to inflate and deflate the inflatable body connected to the multi-port valve, causing the inflatable body to expand and contract, respectively, to simulate the motions of organisms in water. The multi-port valve can change the direction of airflow, from inside to outside the expandable and contractible member, following a repetitive timing sequence, thereby producing repetitive movement of the expandable and contractible member.

In one embodiment, the multi-port valve can be operated between at least two states. In the first state, the multi-port valve allows airflow from the air compressor to expand the expandable and contractible member. In the second state, airflow from the air compressor is blocked, and the breather port of the multi-port valve is opened to the atmosphere, establishing an air channel from the expandable and contractible member to the atmosphere. This allows the inflatable body to expel air and contract (collapse) under the hydrostatic pressure.

In another embodiment, the multi-port valve is provided with a breather port that communicates with the atmosphere. When the breather port of the multi-port valve is closed, the air compressor feeds air into the inflatable body to inflate it. When the breather port is opened, the air inside the inflatable body is released through the breather port to the atmosphere, causing the inflatable body to contract.

In an embodiment, the inflatable body comprises the expandable and contractible member coupled with a base member. The inlet is located on the base member which also has an outlet for releasing air and/or water from the inflatable body into the water of the aquarium.

In an embodiment, the outlet is connected to an exit tube. The air compressor, multi-port valve, and inflatable body are connected in series.

In another embodiment, the air compressor and multi-port valve are fluidly connected in parallel, then are connected to the inflatable body.

In an embodiment, the expandable and contractible member is made from elastic or non-elastic inflatable material. The base member and the expandable and contractible member are made from transparent or translucent material, with the base member provided with a light source to illuminate both the base member and the expandable and contractible member.

In an embodiment, the base member is configured in a basin shape to accommodate at least a portion of the expandable and contractible member.

In an embodiment, the expandable and contractible member is provided with at least one orifice, allowing at least a portion of the air to be expelled when the inflatable body is inflated. The size or number of the at least one orifice does not prevent water from being expelled through the outlet under continuous inflation. At least part of the air being expelled produces a bubbling effect in the aquarium thus oxygenating the water.

In an embodiment, the multi-port valve is connected to one or more of a programmable logic controller, custom control circuit, optical sensor, wireless device, and/or a Bluetooth device. The programmable logic controller is configured to control the duration the breather port remains closed based on a first time interval, and the duration the breather port remains open based on a second time interval. The first and second time intervals are random and/or variable.

In an embodiment, the expandable and contractible member is provided with one or more surface features, such that the one or more surface features produce visual dynamics in the water as the member expands and contracts. The one or more surface features include tentacles and/or spikes.

In an embodiment, the system further comprises one or more adjacent inflatable bodies, where the inflatable body and the adjacent inflatable bodies are fluidly connected in series. The exit tube of the inflatable body is fluidly connected to the inlet of the adjacent inflatable body.

In an embodiment, a decorative base is included for securing the inflatable body. The inflatable body is secured to the decorative base through elastic elements, which secure the base member to mounting slot of the decorative base by stretching over protrusions on the decorative base.

According to a second aspect of the invention, there is provided a method for creating motions simulating aquatic organisms in an aquarium, comprising the steps of:

1. fluidly connecting an air compressor, a multi-port valve, and an inflatable body via tubing;
2. positioning the air compressor and the multi-port valve outside the aquarium, while the inflatable body is located inside the aquarium;
3. continuously supplying air to the multi-port valve by operating the air compressor;
4. closing the breather port of the multi-port valve, allowing the air compressor to inject air into the inflatable body, thereby causing the inflatable body to expand;
5. opening the breather port of the multi-port valve to release air from the inflatable body, causing the inflatable body to contract; and
6. repeating steps 4 and 5 to cycle the inflatable body between expansion and contraction, simulating motions of aquatic organisms in water.

In an embodiment, the method further comprises adjusting the frequency and duration of the repetition sequence in steps 4 and 5 to change the intensity and speed of the dynamics.

In an embodiment, the multi-port valve includes a programmable controller for controlling the duration the breather port remains closed and opened during steps 4 and 5. The programmable logic controller is configured to control the time the breather port remains closed based on a first time interval and to control the time the breather port remains open based on a second time interval.

In an embodiment, the first and second time intervals are random and/or variable.

In an embodiment, step 4 further includes expelling at least a portion of the air from the inflatable body into the water, where the inflatable body is equipped with at least one orifice, allowing at least a portion of the air to be expelled when the inflatable body is inflated. The size or number of the at least one orifice does not prevent water from being expelled through the outlet under continuous inflation. At least part of the air being expelled produces a bubbling effect in the aquarium thus oxygenating the water.

In an embodiment, the method further includes providing one or more surface features on the inflatable body, such that the inflatable body, when expanding and contracting, produces visual dynamics in the water, where the one or more surface features include tentacles and/or spikes.

The advantage of the invention is that through a simple and effective system design, it can create realistic, diverse, and adjustable underwater organism dynamics effects. Compared to traditional methods, the invention has more flexibility, is easier to operate, and can provide a more realistic and dynamic viewing experience. Furthermore, the installation and maintenance costs of the system are low, suitable for aquariums of various sizes, and can be customized and expanded according to user needs. These designs simulating the motions of aquatic organisms add dynamic elements to the aquarium, significantly enhancing the visual effects and attractiveness of the aquarium, while also promoting the health and comfort of aquatic life within the aquarium. Another objective of the invention is to provide alternatives to certain aquatic organisms, such as anemones and some cnidarians, for people to use in decorating aquariums, thereby reducing the demand for harvesting marine organisms as decorations, and helping to promote marine conservation.

BRIEF DESCRIPTION OF THE DRAWINGS

The present invention will now be more specifically described by way of example only with reference to the accompanying drawings, in which:

FIG. 4A and FIG. 4B show enlarged views of air flows in which the breather valve is opened and closed, according to the embodiment shown in FIG. 1;

The figures herein are for illustrative purposes only and are not necessarily drawn to scale.

DESCRIPTION OF THE PREFERRED EMBODIMENTS

The following clearly and completely describes the technical solutions in the embodiments of the present invention with reference to the accompanying drawings. Apparently, the described embodiments are merely some but not all of the embodiments of the present invention. All other embodiments based on the embodiments of the present invention and obtained by a person of ordinary skill in the art without investing creative efforts shall fall within the scope of the present invention.

Figure 1:
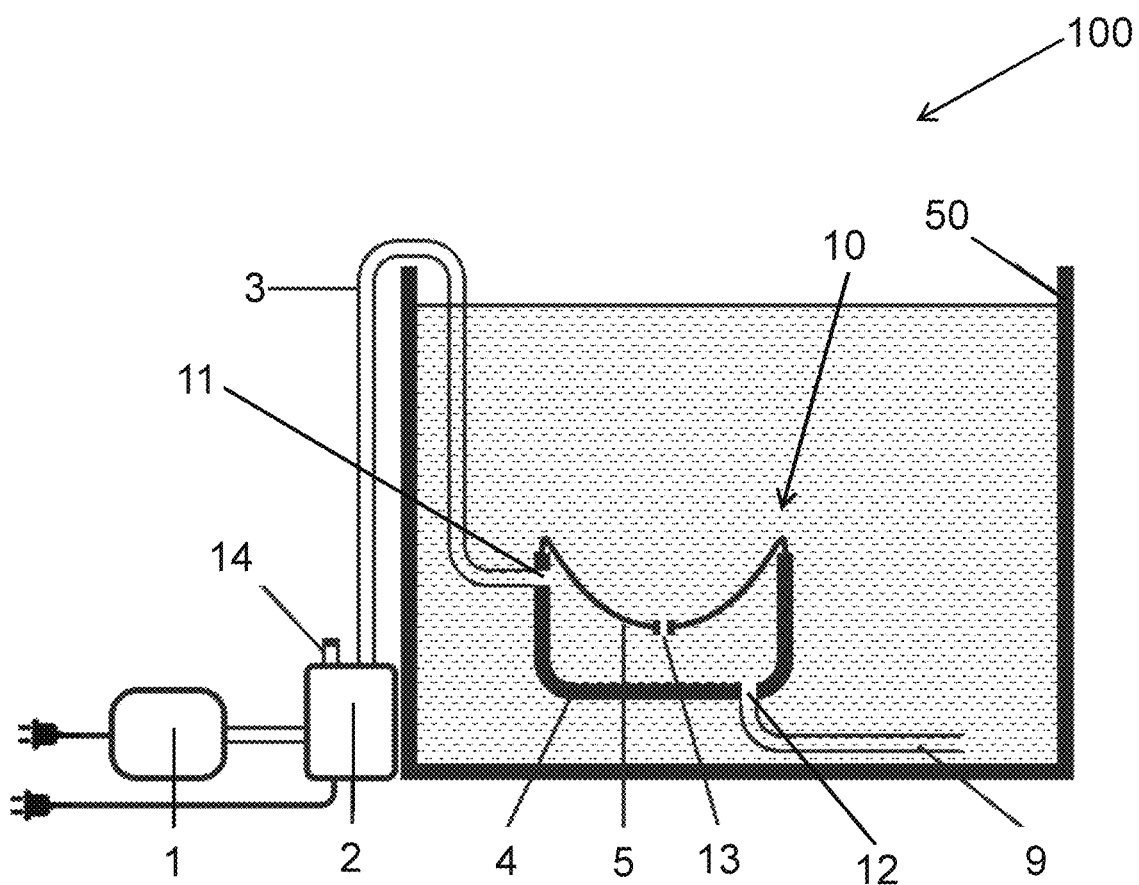
FIG. 1 shows an aquarium ornamental motion system according to an embodiment of the present invention.

FIG. 1 illustrates an aquarium ornamental motion system 100 according to an embodiment of the present invention. The system includes an air compressor 1 configured to compress air entering from an inlet (i.e., air pump), an electromechanical or mechanically operated multi-port valve 2, tubing 3 connecting the air compressor 1 and multi-port valve 2, a base member 4, an expandable and contractible member 5, and a decorative base 6. The base member 4 is designed to couple with the expandable and contractible member 5 to jointly form an inflatable body 10, allowing at least a part of the inflatable body 10 to expand or contract in response to changes in internal air pressure. The decorative base 6 is provided with one or more mounting slots 7 to retain and help secure one or more inflatable bodies 10. The air compressor 1, multi-port valve 2, and inflatable body 10 are connected in series via tubing 3. The air compressor 1 and multi-port valve 2 are positioned outside the aquarium 50, while the inflatable body 10 and decorative base 6 are placed inside the aquarium 50 submerged in water. The expandable and contractible member 5 can be made from elastic or non-elastic inflatable materials. The inflatable body 10 inflates and expands outwardly with air supplied by the air compressor 1 and collapses inwardly when deflated. Specifically, the base member 4 is provided with an inlet 11 and an outlet 12. The inlet 11 is connected to one of the tubing 3 to receive air from the air compressor 1, while the outlet 12 allows air propelled by the air compressor 1 to enter directly into the water through the outlet 12 and exit tube 9 (refer to FIG. 1). The outlet 12 may be connected to an inlet 11' of a base member 4' of an adjacent inflatable body 10' via the exit tube 9 (refer to FIG. 2).

The base member 4, for coupling with the expandable and contractible member 5, can have a basin shape or other suitable geometric shapes or forms to accommodate at least a part of the expandable and contractible member 5 when it collapses under the surrounding water pressure. The expandable and contractible member 5 is provided with at least one orifice 13 to allow at least a portion of the air to be released into the water when it is inflated to a certain air pressure. The at least one orifice 13 is located at an upper end of the expandable and contractible member 5. Preferably, the size or number of the at least one orifice does not prevent water from being expelled through the outlet under continuous inflation. If the orifice 13 is too large or too many, most of the air entering the inflatable body 10 will be lost, preventing sufficient air from being input through the outlet 12 and exit tubing 9 into the serially connected adjacent inflatable body 10', leading to hindered expansion of inflatable body 10' due to insufficient air. Conversely, if the orifice 13 is sealed, sufficient air can be fed through the outlet 12 and exit tube 9 into the serially connected adjacent inflatable bodies 10', 10", etc. However, with the orifice 13 sealed, the inflatable bodies 10, 10', 10", etc., will not perform the bubbling function. The expelled water leaves the base member 4 through the exit tube 9, then directly enters the aquarium 50 through the outlet 12 and exit tube 9, or enters the inlet 11' of the serially connected adjacent inflatable body 10' (refer to FIG. 2).

Advantageously, the multi-port valve 2 can be equipped with a programmable logic controller, custom control circuit, switches, optical sensors, wireless device, and/or a Bluetooth device (not shown) for controlling the physical operation of the multi-port valve 2. The programmable logic controller of the multi-port valve 2 can be pre-programmed to control the timing of inflating and deflating the inflatable body 10. The multi-port valve 2 can operate between at least two states: in the first state, the multi-port valve 2 closes the breather port 14, allowing the airflow from the air compressor 1 to pass directly through its inlet 11 and outlet 12, enabling the air compressor 1 to directly inflate the expandable and contractible member 5. In the second state, the multi-port valve 2 opens the breather port 14, allowing the air in the expandable and contractible member 5 to be released to the atmosphere through tubing 3, thereby reducing pressure to atmospheric levels and causing the surrounding water's static pressure to act on the surface of the expandable and contractible member 5, thereby causing it to collapse. By controlling the timing of opening and closing the breather port 14, the inflation and deflation of the expandable and contractible member 5 can continuously occur in the aquarium 50, forming motions that mimic "breathing" of certain aquatic organisms.

In one embodiment, the multi-port valve 2 is a compact device, for example, no larger than a 2×2×1 inch box shape, installed outside the aquarium 50 adjacent to the air compressor 1. Although the design of the multi-port valve 2 is not critical to the operation of the system, it is important that it has a specific appearance that does not affect the overall aesthetics of the aquarium 50. The air compressor 1 can be integrated into the same casing as the multi-port valve 2 or can be a separate component added to the system 100 and connected to the multi-port valve 2 via tubing 3. Either way, the object is to ensure the efficient operation of the air compressor 1 without significantly impacting the overall appearance of the aquarium 50. In another embodiment, multiple multi-port valves 2 can be placed at various locations outside the aquarium 50 to simultaneously guide air from the air compressor 1 into the inflatable body and guide air from the system 100 to the atmosphere.

FIGS. 3A to 3F illustrate the operational procedures of the aquarium ornamental motion system 100 according to the present invention. Initially, referring to FIGS. 3A and 3B, the air compressor 1 forces air into the multi-port valve 2 at a preset or variable flow rate. The air compressor 1 feeds air through the multi-port valve 2 while the breather port 14 remains closed. The air enters the inflatable body 10, comprising the base member 4 and the expandable and contractible member 5, which is submerged in the water of the aquarium 50.

Figure 3A:
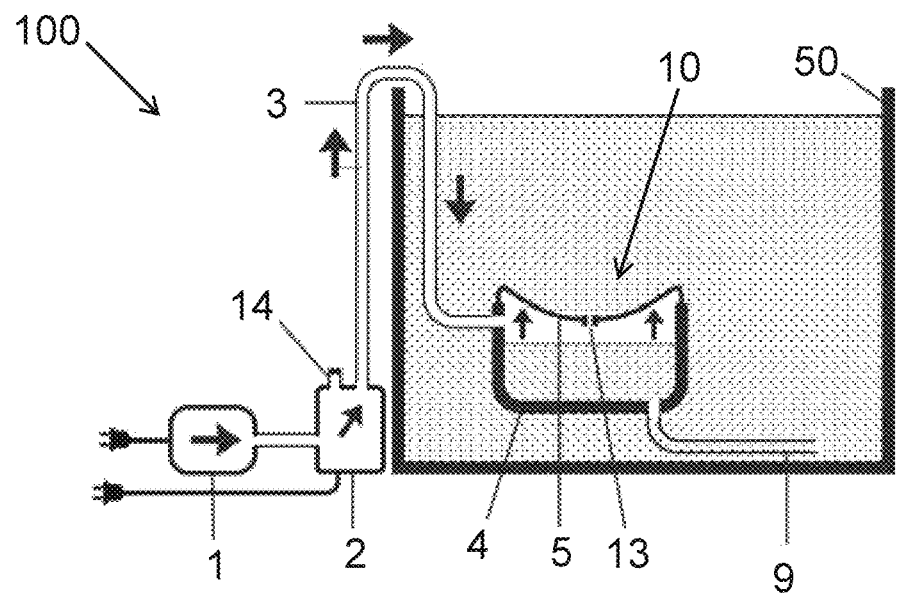
FIG. 3A to FIG. 3F illustrate the operation cycle of the aquarium ornamental motion system according to the embodiment shown in FIG. 1.

Referring to FIG. 3A, the inflatable body 10 is partially inflated due to air input from the air compressor 1. Besides the air input from the air compressor 1, the inflatable body 10 is also partially filled with water from the aquarium 50. As shown, the hydrostatic pressure acts on the expandable and contractible member 5, causing it to collapse inward. At this time, the expandable and contractible member 5 is in a collapsed state.

Figure 3B:
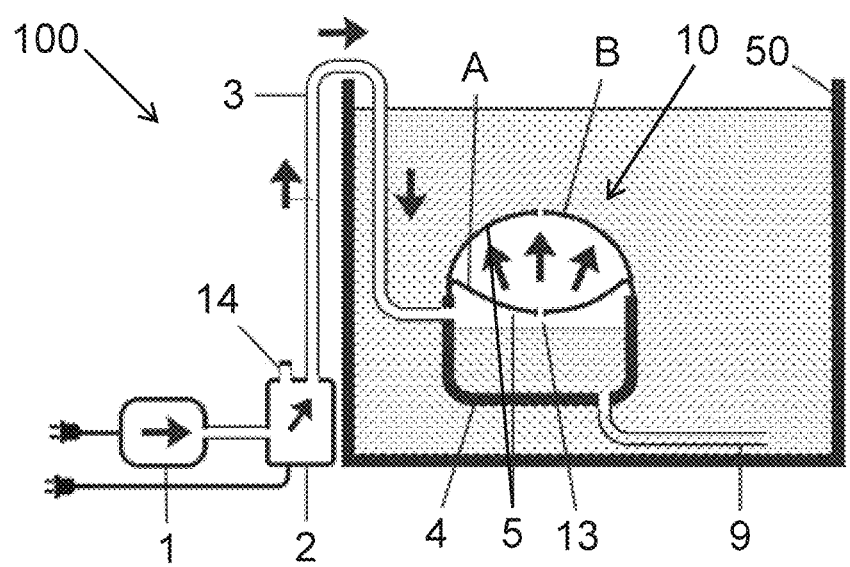

Referring to FIG. 3B, the air compressor 1 further inputs air and increases the pressure inside the inflatable body 10. As the air pressure inside the inflatable body 10 rises, the expandable and contractible member 5 bulges upward, moving from position A to B. The movement of the expandable and contractible member 5 from position A to B creates a motion visible to the audience of the aquarium. At this time, the expandable and contractible member 5 is in an expanded state. As the air compressor 1 continues to run, the air pressure inside the inflatable body 10 continues to rise.

Figure 3C:
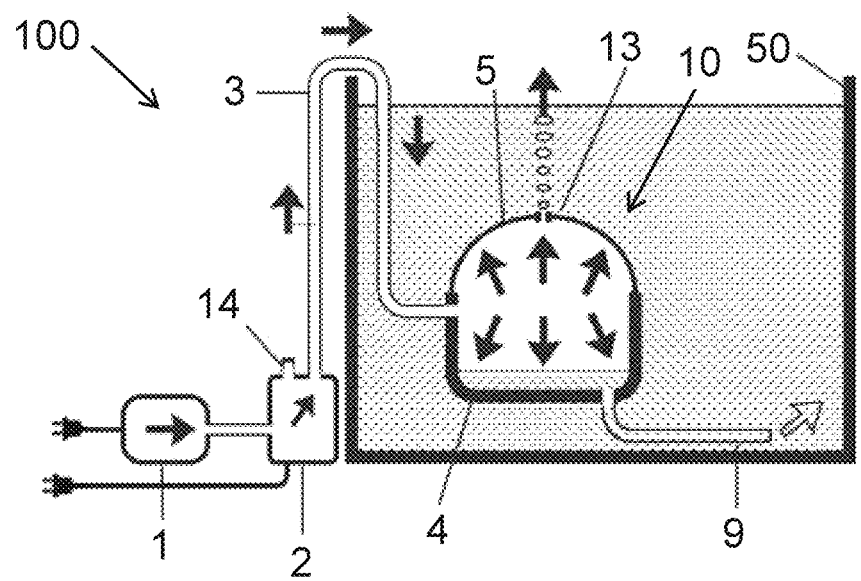
Figure 3D:
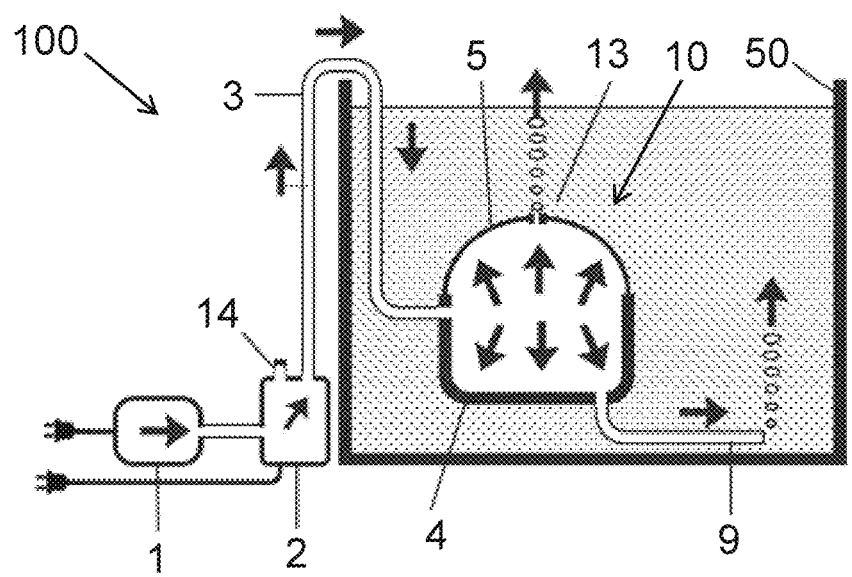

Referring to FIG. 3C, the rising air pressure expands the expandable and contractible member 5 to a predetermined level or threshold. While the expandable and contractible member 5 remains in an expanded state, the air pressure inside the inflatable body 10 acts on the water inside the inflatable body 10. Moreover, at least one orifice 13 provided on the expandable and contractible member 5 allows a part of the air inside the inflatable body 10 to overflow into the aquarium 50, also serving to slow down the expulsion of water from the inflatable body 10 into the aquarium 50. As the air compressor 1 continues to run, the air pressure inside the inflatable body 10 forces all the water to be expelled from the inflatable body 10, as shown in FIG. 3D. Once all the water is expelled from the inflatable body 10, the air inside the inflatable body 10 is then expelled through the orifice 13 and exit tube 9. Since the air pressure inside the inflatable body 10 still exceeds the hydrostatic pressure, the expandable and contractible member 5 remains in an expanded state.

Figure 3E:
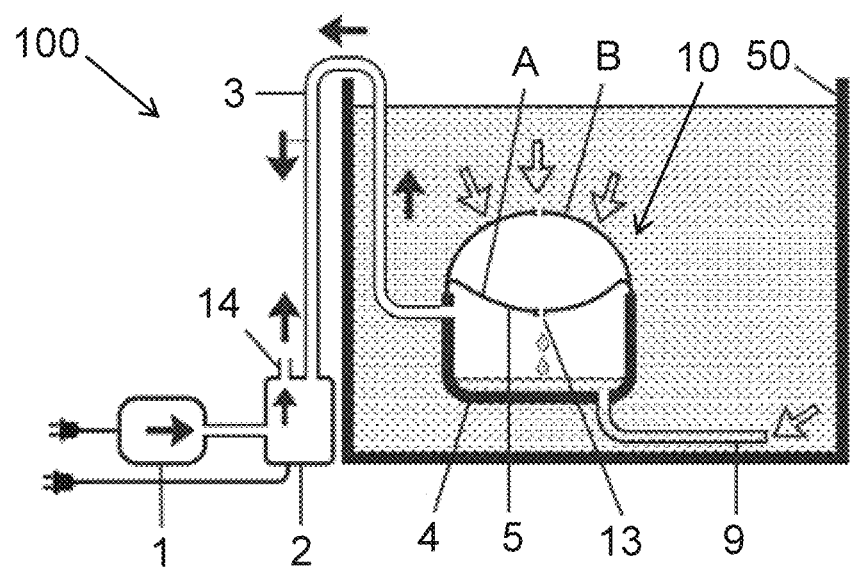
Figure 3F:
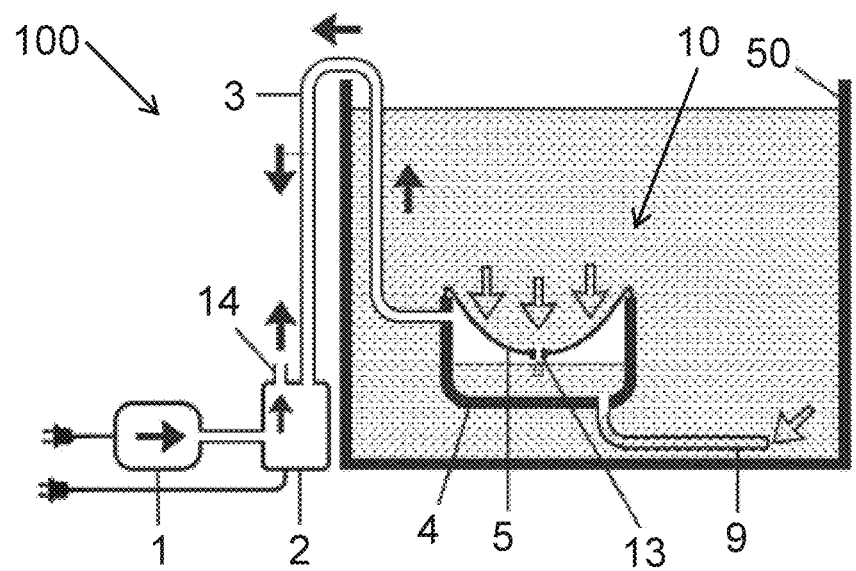

FIG. 3E illustrates the moment when the multi-port valve 2 opens the breather port 14. Preferably, the multi-port valve 2 can be internally programmed to control the opening and closing of the breather port 14. For example, the breather port 14 has a default closed position. The multi-port valve 2 can be configured to keep the breather port 14 continuously closed for a first time interval, which should be long enough for the system to execute the procedures from FIG. 3A to FIG. 3D. After the first time interval, the multi-port valve 2 continues to open the breather port 14 for a second time interval. Similarly, the second time interval should be long enough for the system to execute the procedures from FIG. 3E to FIG. 3F. Both the first and second time intervals can be constant and predetermined, but they can also be random or determined by the user. When the breather port 14 is open, the air inside the inflatable body 10 and the air supplied by the air compressor 1 can enter the atmosphere through the tubing 3 via the breather port 14. This causes the air pressure inside the inflatable body 10 to drop towards atmospheric pressure levels. Without the pressurized air inside the inflatable body 10 to support the expandable and contractible member 5 in its expanded state, the hydrostatic pressure acting on the outer surface of the expandable and contractible member 5 causes it to collapse inward, moving from position B to A, as illustrated. Similarly, the movement of the expandable and contractible member 5 from position B to A generates visible motions from outside the aquarium. As the hydrostatic pressure continues to act on the expandable and contractible member 5, it remains in a collapsed state, as shown in FIG. 3F. Since the internal air pressure of the inflatable body 10 is less than the hydrostatic pressure, water enters the inflatable body 10 through the orifice 13 and exit tube 9 until the interior of the inflatable body 10 is filled with water, just as initially shown in FIG. 3A. When the second time interval has passed, the system 100 re-executes the procedures from FIG. 3A to FIG. 3D and operates the multi-port valve 2 to close the breather port 14 again. Through using the controller which controls the multi-port valve 2 and its internal programming logic, the cycle of the above operation sequence repeats (i.e., from FIG. 3A to FIG. 3F). Advantageously, by adjusting the frequency and duration of the time sequence of repeated inflation and deflation, the intensity and speed of the motions (expansion and contraction) of the inflatable body 10 or the expandable and contractible member 5 can be changed. The programmable logic controller is configured to control the time the breather port remains closed based on the first time interval and to control the time the breather port remains open based on the second time interval. The first and second time intervals are random and/or variable. For instance, the internal programming logic can randomly vary the first and second time intervals, making the dynamic cycle of the inflatable body 10 irregular, thereby enhancing the realism of the expandable and contractible member 5 which simulates the motions of certain aquatic organisms.

FIGS. 4A to 4B illustrate the operational principles of the air compressor 1 and the multi-port valve 2 according to the embodiment from FIGS. 3A to 3F. In this embodiment, the air compressor 1, the multi-port valve 2, and the inflatable body 10 are connected in series via tubing 3. According to FIG. 4A, the breather port 14 of the multi-port valve 2 is in a closed state, forcing the air supplied by air compressor 1 into the inflatable body 10 located within the aquarium 50. FIG. 4B then shows the breather port 14 being opened, allowing the air supplied by air compressor 1 and the air within the inflatable body 10 to enter the atmosphere through the breather port 14, thereby creating a negative pressure inside the inflatable body 10.

Figure 4C:
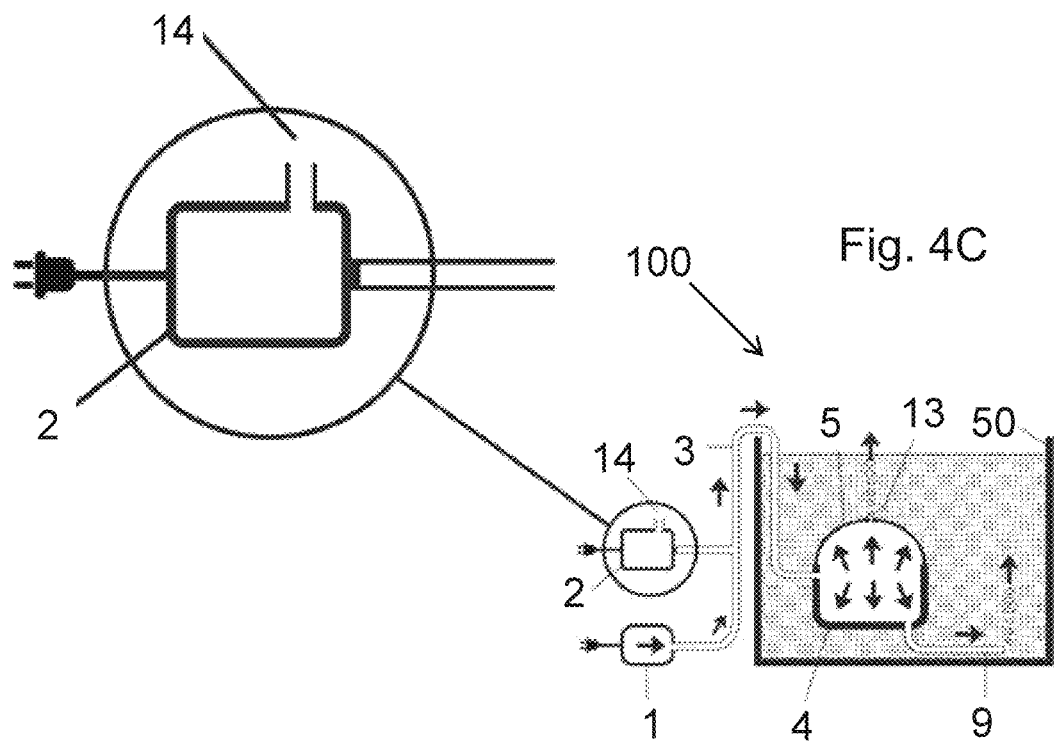
FIG. 4C and FIG. 4D show enlarged views of air flows in which the breather valve is open and closed, according to the further embodiment.
Figure 4D:
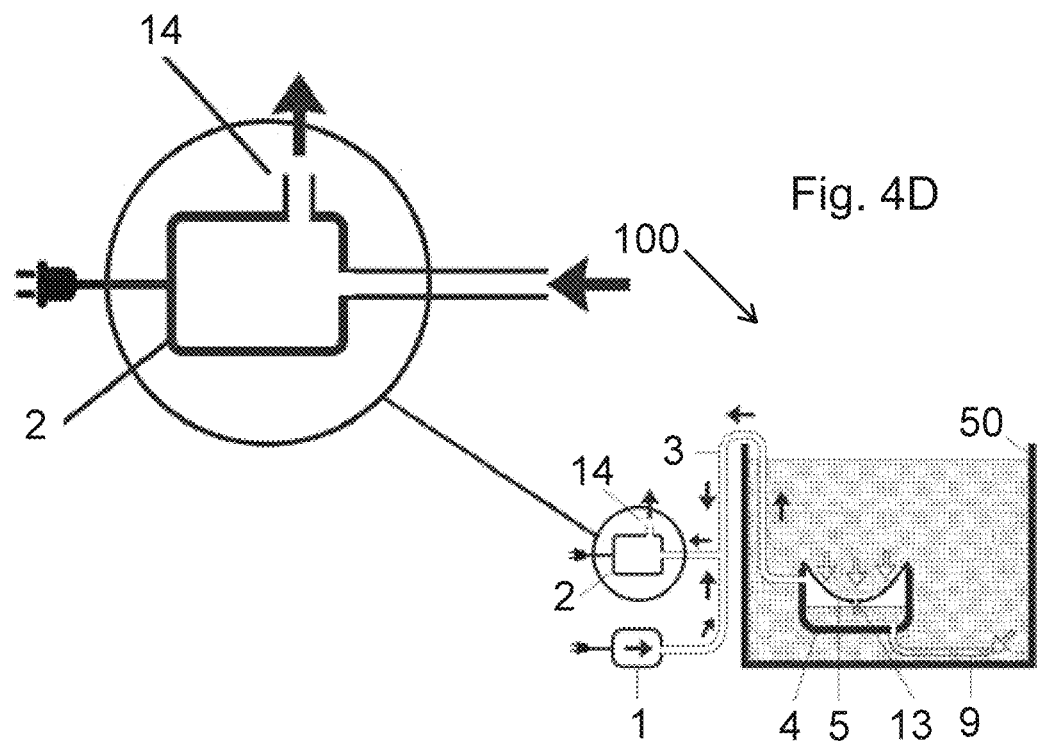

FIGS. 4C to 4D depict another very similar embodiment and illustrate the operational principles of the air compressor 1 and the multi-port valve 2 according to this embodiment. Differing from the example in FIGS. 4A to 4B, the air compressor 1 and the multi-port valve 2 are first connected in parallel through a "T" shaped pipe (i.e., a three-way pipe) via tubing 3, and then connected in series to the inflatable body 10. As illustrated in FIG. 4C, the breather port 14 of the multi-port valve 2 is closed, forcing the air supplied by air compressor 1 into the inflatable body 10 in the aquarium. According to FIG. 4D, the breather port 14 is opened, allowing the air supplied by air compressor 1 and the air within the inflatable body 10 to enter the atmosphere through the breather port 14, and creating a negative pressure inside the inflatable body 10.

Figure 2:
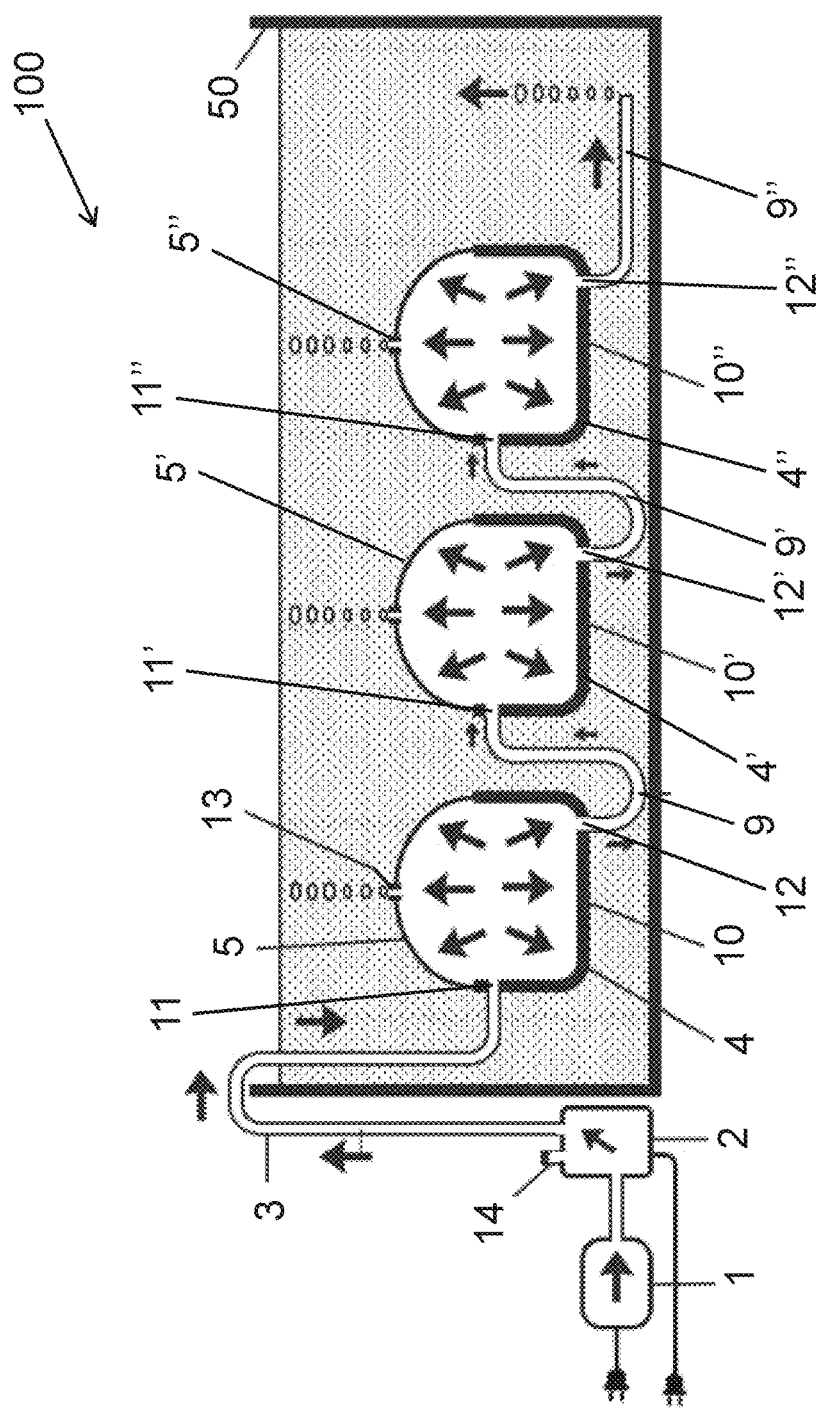
FIG. 2 shows an aquarium ornamental motion system according to a further embodiment of the present invention, in which more than one inflatable body are connected in series.

In another embodiment as shown in FIG. 2, two or more inflatable bodies 10, 10', 10" can be connected in series. In this case, the outlets 12, 12', 12" of each base member 4, 4', 4" are connected through exit tube 9, 9' to the inlets 11', 11" of the adjacent base members 4', 4". The air compressor 1 forces air through the several serially connected inflatable bodies 10, 10', 10", until it is expelled into the aquarium 50 through the exit tube 9" of the last base member 10". This setup provides a cohesive and visually appealing multi-dynamic display, significantly enhancing the visual effect produced by the system 100.

Figure 5:
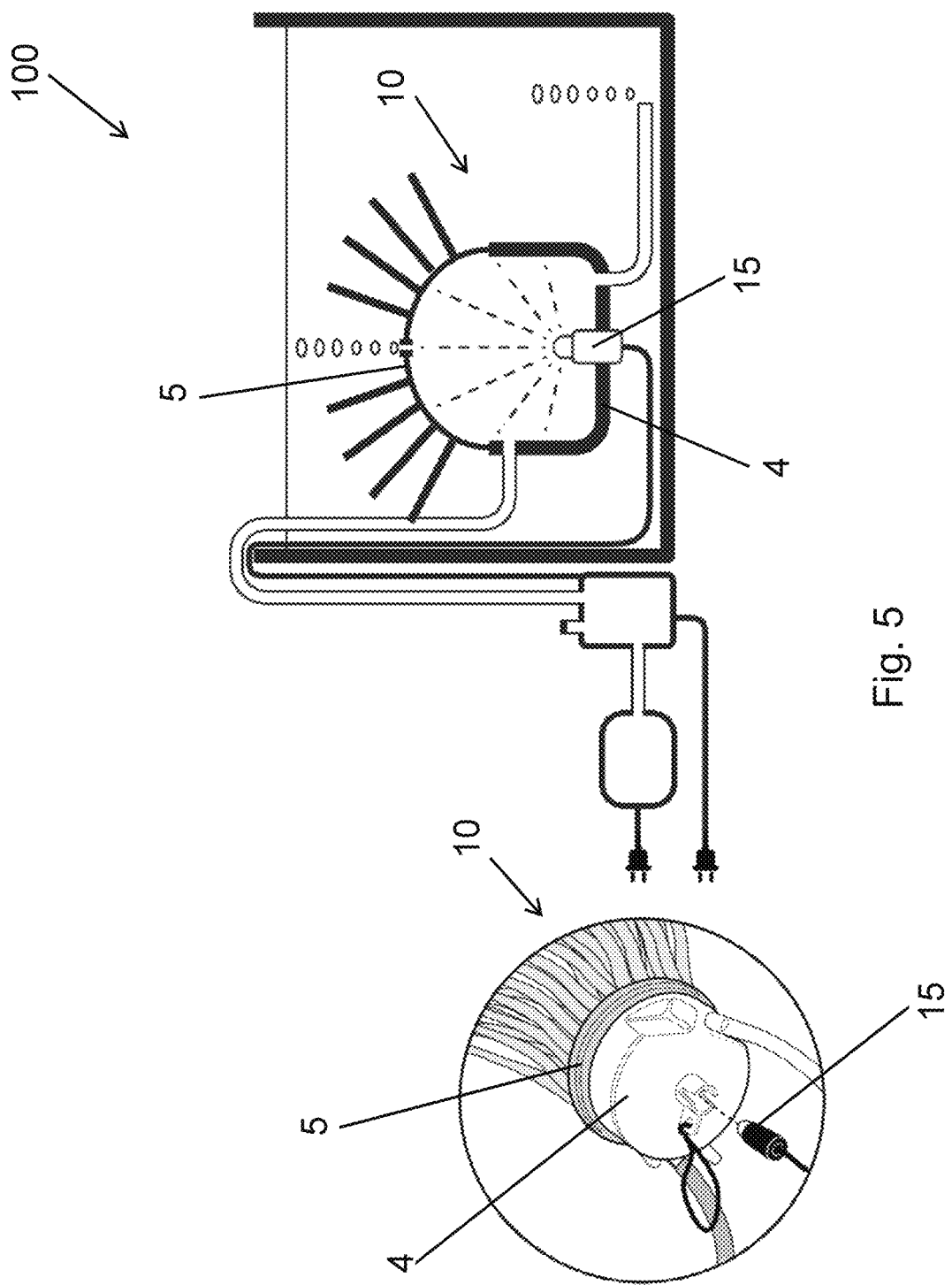
FIG. 5 shows another embodiment of the aquarium ornamental motion system having a built-in light source.

In another embodiment, a light source, such as one or more LED lights 15, can be provided inside the base member 4 to illuminate the expandable and contractible member 5. The LED lights 15 can be connected to the multi-port valve 2 via wires to provide power. Especially when viewed in low light conditions, the setup with the aforementioned light sources forms a visually striking, internally illuminated decoration, mimicking some bioluminescent marine organisms. As shown in FIG. 5, the base member 4 and the expandable and contractible member 5 can be transparent and/or translucent, allowing the light emitted by the LED lights 15 to pass through and illuminate the expandable and contractible member 5, along with the dynamic features of its surface as it expands and contracts. Moreover, the expandable and contractible member 5 can be made of self-illuminating materials to increase visual appeal. Additionally, as illustrated, the expandable and contractible member is made of a flexible, translucent material, facilitating the diffusion of light from the LED lights 15 mounted on the base member 4. According to an embodiment, the expandable and contractible member 5 has a shape mimicking an anemone and is made of silicone or another flexible material. The expandable and contractible member 5 can be coupled to the base member 4 to form the inflatable body 10 by stretching over the base member 4.

Figure 6:
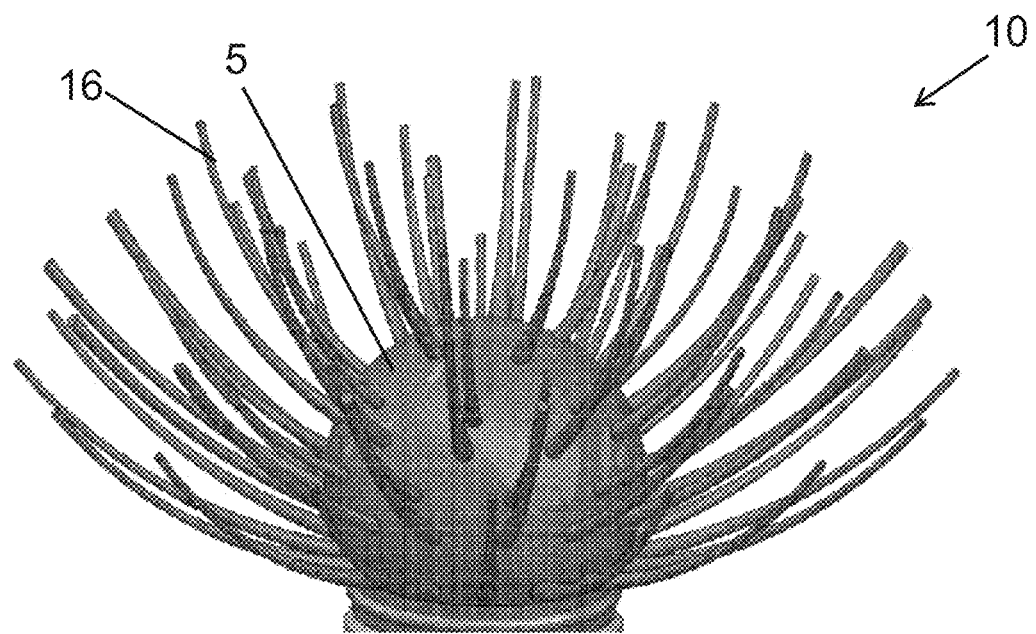
FIG. 6 shows an example of the expandable and contractible member which mimics an anemone.

As shown in FIG. 6, to enhance dynamic visual effects, physical surface features 16, such as tentacles and spikes, can be added to the outer surface of the expandable and contractible member 5. The movement of these surface features 16 mimics some rhythmic motions of marine organisms, such as anemones and cnidarians, and creates visually appealing motions in the water as the inflatable body 10 expands and contracts. In use, the tentacles and spikes on the expandable and contractible member 5 sway in the water, creating a visually attractive natural effect. This unique design adds interest and randomness to the simulation of aquatic dynamics, providing viewers with a more immersive experience. Utilizing physical surface features 16, like tentacles and spikes, is an effective and creative way to enhance motional visual effects, resulting in a natural and pleasing spectacle that significantly increases the aesthetic and realism of the aquatic environment.

In an alternative embodiment, design features (not shown) can be added around the orifice 13 on the expandable and contractible member 5. For example, these features could mimic the mouths or teeth found in live anemones or urchins. Such features may be particularly important when marketing the product as an ecological alternative to real marine organisms. Besides enhancing the dynamic effect of the expandable and contractible member 5 in the water, these design features can make it appear more realistic. During the operation of system 100, the orifice 13 allows pressurized air to be expelled from the inflated inflatable body 10. Essentially, this feature not only adds an extra visual effect to the aquarium but also provides the functionality of generating bubbles, thereby increasing the oxygen content in the water.

Figure 7:
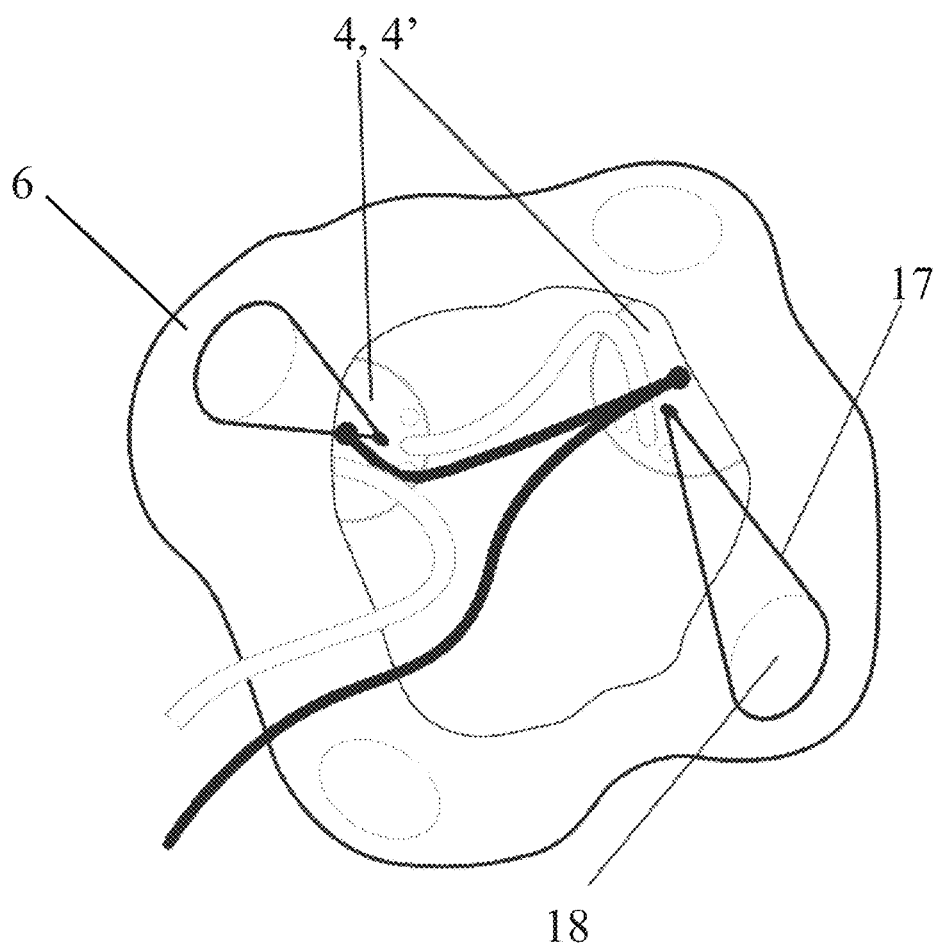
FIG. 7 shows the decorative base for securing the inflatable body, according to another embodiment of the invention.
Figure 8:
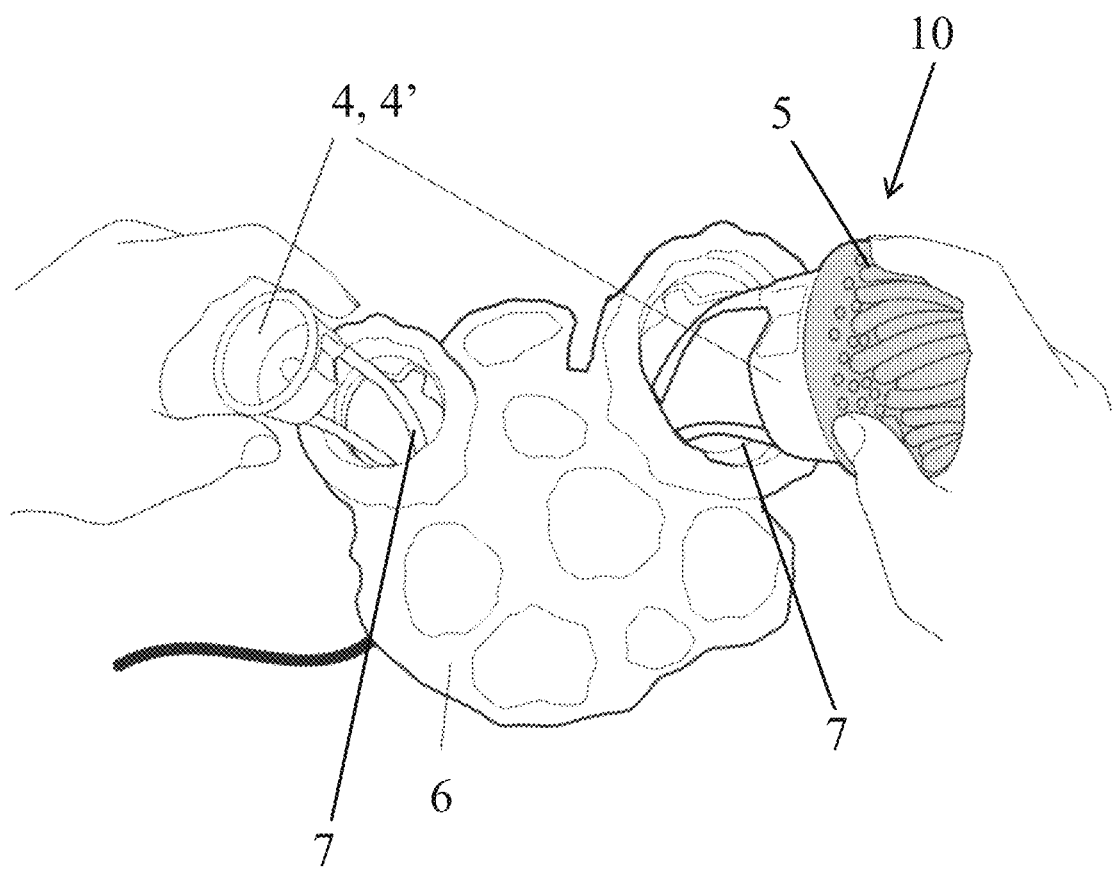
FIG. 8 shows how the base member is fitted into the decorative base.

FIGS. 7 and 8 show a decorative base 6, used to hold and secure one or more inflatable bodies 10. Preferably, the decorative base 6 may be designed to mimic marine rocks or similar objects, blending perfectly with the environment inside aquarium 50. The inflatable body 10 is supported by the decorative base 6 through one or more elastic elements 17. The elastic elements 17 serve to secure the inflatable body 10 on the decorative base 6. Specifically, the function of the elastic elements 17 is to bias the base member 4 to an appropriate position, while applying pressure on a protrusion 18 on the decorative base 6, thereby securing the base member 4 in the mounting slot 7 of the decorative base 6. This mechanism ensures that the inflatable body 10 is tightly fastened to the decorative base 6, reducing the risk of slipping or shifting. Moreover, this design facilitates the replacement of the expandable and contractible member 5 without affecting the decorative base 6 or any other components in system 100. Replaceable expandable and contractible members 5 may also come in different styles and colors, allowing for customization and variety in the display. The decorative base 6 can feature a carved, hand-painted base, or one or more customized appearances, designed to cater to various customer age groups, cultural preferences, and other personal requirements.

In an exemplary embodiment, the aquarium ornamental motion system is designed to operate within a standard working temperature range of 23-29 degrees Celsius, typical of aquarium environments. The electronic board in the system requires a DC 5V 0.6A power supply. Essentially, any known USB adapter can also be used to power the system. The light effects of the red/green/blue colored LED lights used in the system are as follows: red 800MCD, green 2500MCD, and blue 2000MCD. These LED lights are encased in a waterproof housing in a molded encapsulation manner, to be stationed in the water of the aquarium. Each inflatable body or decorative base can include multiple LED lights. Various components of the system can be connected by multiple 3 mm flexible air tubes. The size of components varies with the scalability of the system. For instance, in a practical scheme, the system is designed to fit and operate in a 10-gallon aquarium with dimensions of 20 inches in length, 10 inches in width, and 12 inches in height, and the decorations measure approximately 10 inches long, 8 inches wide, and 8 inches high. The size of the expandable and contractible members and their associated base members can also vary, with larger expandable and contractible members having a spherical diameter of about 3 inches when fully expanded, while smaller expandable parts have a spherical diameter of about 1.5 inches. For example, the dimensions of an electronic multi-port valve can be about 2 inches long, 2 inches wide, and 1 inch high.

Although the description herein describes the embodiments in an exemplary manner, not every embodiment contains only a single technical solution. The description herein is merely provided for clarity. Those skilled in the art should regard this document as a whole, where technical solutions in various embodiments can also be appropriately combined to form other embodiments appreciable by those skilled in the art. However, the scope of the present invention is defined by the attached claims rather than the foregoing description, thus all changes within the meaning and range equivalent of the claims are intended to be embraced therein.

What is claimed is:

1. A motion ornamental system for aquariums, comprising:
   an air compressor for propelling airflow,
   a multi-port valve being positioned outside the aquarium along with the air compressor;
   an inflatable body, located inside the aquarium, having an inlet connecting to the multi-port valve and an outlet in fluid communication with the aquarium, and
   tubing for fluidly connecting to the air compressor, the multi-port valve and the inflatable body;
   wherein the system is configured to inflate and deflate the inflatable body by operation of the air compressor and the multi-port valve, thereby causing the inflatable body to expand and contract, respectively, to simulate motions of living organisms in water, and
   wherein during deflating the system is configured to allow water inside the aquarium to enter into the inflatable body through at least one orifice and the outlet.

2. The system according to claim 1, wherein the multi-port valve comprises a breather port that communicates with the atmosphere, when the breather port of the multi-port valve is closed, the air compressor feeds air into the inflatable body causing it to expand, and when the breather port is opened, air from the inflatable body is expelled through the breather port to the atmosphere causing the inflatable body to contract.

3. The system according to claim 1, wherein the inflatable body comprises an expandable and contractible member coupled with a base member.

4. The system according to claim 1, wherein the inlet and the outlet are positioned on the base member, the outlet is configured for releasing air and/or water from the inflatable body into the water of the aquarium, the outlet is connected to an outlet tube.

5. The system according to claim 1, wherein the air compressor, the multi-port valve, and the inflatable body are connected sequentially in series.

6. The system according to claim 1, wherein the air compressor and the multi-port valve are fluidly connected in parallel, then are connected to the inflatable body.

7. The system according to claim 3, wherein the expandable and contractible member is made from an elastic or inelastic inflatable material, the expandable and contractible member is provided with at least one orifice, allowing at least a portion of the air to be expelled when the inflatable body is being inflated.

8. The system according to claim 3, wherein the base member and the expandable and contractible member are made from transparent or translucent material, the base member is provided with a light source for illuminating the base member and the expandable and contractible member, the base member is shaped like a basin to accommodate at least a part of the expandable and contractible member.

9. The system according to claim 7, wherein the size or number of the at least one orifice does not prevent water from being expelled through the outlet under continuous inflation, at least part of the air being expelled produces a bubbling effect in the aquarium thus oxygenating the water.

10. The system according to claim 1, wherein the multi-port valve is connected to one or more of the following: a programmable logic controller, a custom control circuit, an optical sensor, a wireless device and/or Bluetooth device, the programmable logic controller is configured to control a duration the breather port remains closed according to a first time interval, and to control a duration the breather port remains open according to a second time interval.

11. The system according to claim 10, wherein the first and second time intervals are random and/or variable.

12. The system according to claim 3, wherein the expandable and contractible member is provided with one or more surface features, such that the one or more surface features produce visual dynamics in the water as the member expands and contracts, the one or more surface features comprise tentacles and/or spikes.

13. The system according to claim 1, further comprising one or more adjacent inflatable bodies, where the inflatable body and the one or more adjacent inflatable bodies are fluidly connected in series, the outlet tube of the inflatable body is fluidly connected to an inlet of the adjacent inflatable body.

14. The system according to claim 1, further comprising a decorative base for securing the inflatable body, wherein the inflatable body is fixed to the decorative base through an elastic member which secures the base member to an installation slot of the decorative base via stretching over protrusions provided on the decorative base.

15. A method for creating dynamics simulating motions of aquatic organisms in an aquarium, comprising the steps of:
1. fluidly connecting an air compressor, a multi-port valve, and an inflatable body via tubing, the inflatable body having an inlet, an outlet, and at least one orifice;
2. placing the air compressor and the multi-port valve outside the aquarium, with the inflatable body located inside the aquarium;
3. continuously supplying air to the multi-port valve by operating the air compressor;
4. closing the breather port of the multi-port valve, allowing the air compressor to feed air into the inflatable body through the inlet, thereby causing the inflatable body to expand;
5. opening the breather port of the multi-port valve to release the air from the inflatable body and to allow water in the aquarium to enter into the inflatable body through the at least one orifice and the outlet, thereby causing the inflatable body to contract; and
6. repeating steps 4, and 5, to cycle the inflatable body between expansion and contraction, simulating the dynamics of aquatic organisms in water.

16. The method according to claim 15, further comprising a step of adjusting the frequency and duration of the repetition sequence in steps (4) and (5) to alter the intensity and speed of the dynamics, wherein the multi-port valve comprises a programmable controller for controlling the duration the breather port remains closed and open during steps (4) and (5).

17. The method according to claim 16, wherein the programmable logic controller is configured to control the time the breather port remains closed based on a first time interval and to control the time the breather port remains open based on a second time interval, wherein the first and second time intervals are random and/or variable.

18. The method according to claim 15, wherein step 4 further comprises a step of expelling at least a portion of the air from the inflatable body into the water, wherein the inflatable body is provided with at least one orifice that allows at least a portion of the air to be expelled when the inflatable body is inflated.

19. The method according to claim 18, wherein the size or number of the at least one orifice does not prevent water from being expelled through the outlet under continuous inflation, at least part of the air being expelled produces a bubbling effect in the aquarium thus oxygenating the water.

20. The method according to claim 15, further comprising a step of providing one or more surface features on the inflatable body, such that the inflatable body, when expanding and contracting, produces visual motions in the water, wherein the one or more surface features comprise tentacles and/or spikes.

* * * * *